United States Patent [19]

Sandow

[11] 4,301,841
[45] Nov. 24, 1981

[54] MULTIPURPOSE CONTAINER

[76] Inventor: Kiyoshi Sandow, 8535 Market St., Houston, Tex. 77029

[21] Appl. No.: 86,745

[22] Filed: Oct. 22, 1979

[51] Int. Cl.³ .............................................. B65B 3/04
[52] U.S. Cl. .................................... 141/98; 141/326; 184/106; 220/86 R
[58] Field of Search ............. 141/1, 98, 84, 199–205, 141/247, 297, 298, 299, 300, 331–345, 325, 326, 327; 220/85 F, 85 SP, 86 R; 210/244; 184/1.5, 106

[56] References Cited

U.S. PATENT DOCUMENTS

| Re. 27,449 | 8/1972  | Bartz          | 184/106 |
| 380,476    | 4/1886  | Duffey         | 15/111  |
| 1,346,388  | 7/1920  | Stoler et al.  | 4/450   |
| 1,396,382  | 11/1921 | Pieters        | 4/450   |
| 1,554,589  | 9/1925  | Long           | 184/1.5 |
| 4,099,598  | 7/1978  | Clinard        | 184/106 |
| 4,149,575  | 4/1979  | Fisher         | 141/98  |

*Primary Examiner*—Houston S. Bell, Jr.

*Attorney, Agent, or Firm*—Pravel, Gambrell, Hewitt, Kirk, Kimball & Dodge

[57] ABSTRACT

A multipurpose container for storing, transporting, collecting and disposing of fluids such as motor oil and the like. The multipurpose hollow container includes a top wall, a bottom wall and four connected generally rectangular side walls enclosing the interior. In the top wall is a first threaded pouring outlet having a cooperating removable sealing cap for pouring of the fluids. One side wall is concave shaped with a second threaded opening formed thereon for communication with the interior of the container for providing a funnel for collecting the spent fluid and flowing that fluid into the interior of the container. The second opening is located substantially away from and with its lowermost edge below the first opening which vents the interior to avoid splattering and minimizes overflow spillage. A perforable membrane is secured over the second opening by a removable plug to avoid leads during storage while a handle is provided to aid in transporting and placement of the container.

8 Claims, 5 Drawing Figures

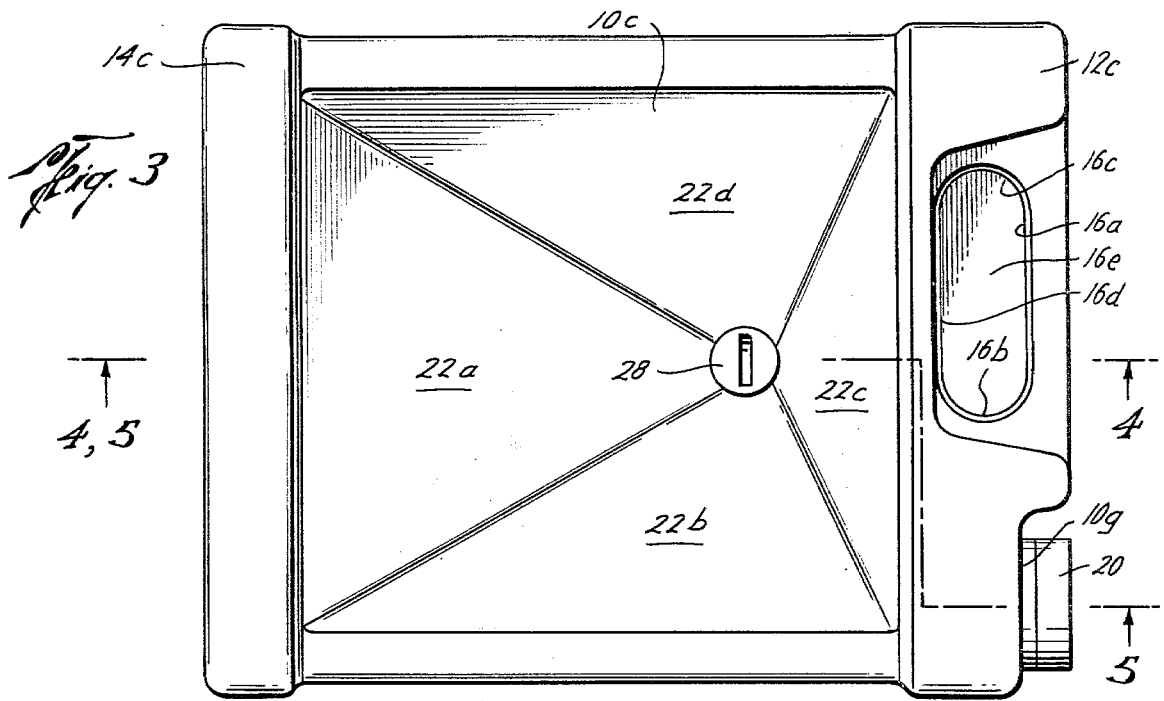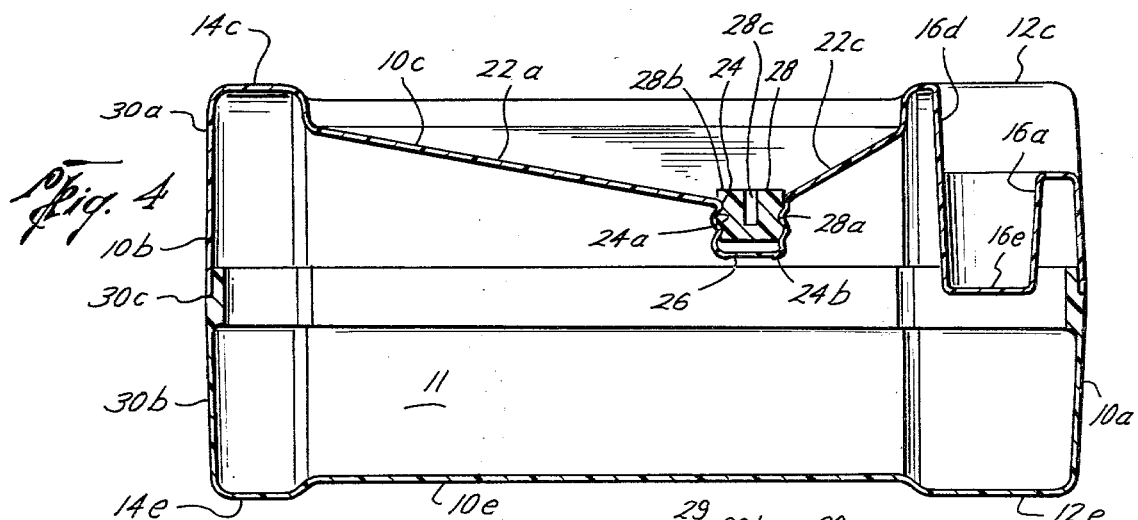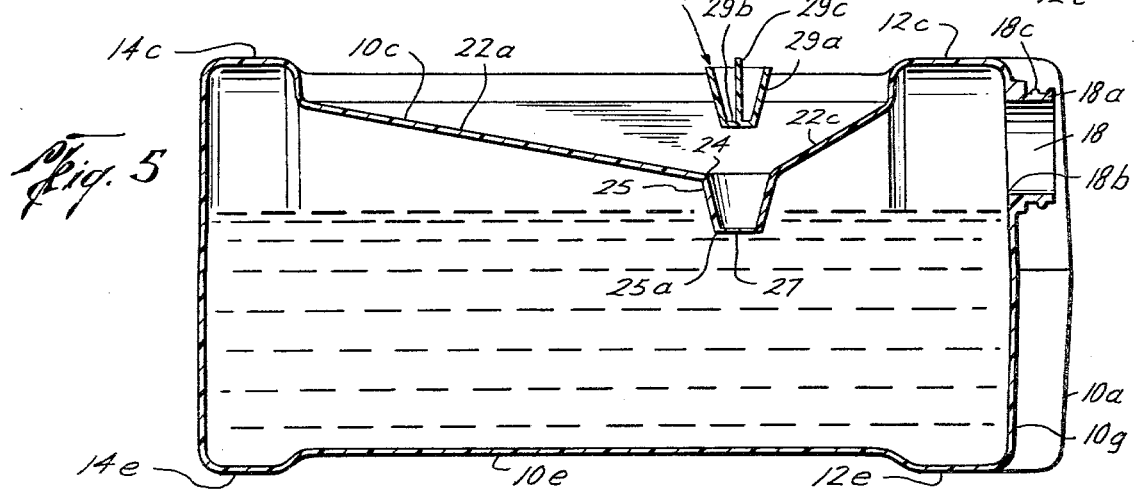

MULTIPURPOSE CONTAINER

TECHNICAL FIELD

This invention relates to multipurpose containers for storing, transporting, collecting and disposing of fluids such as motor oil and the like.

PRIOR ART

Many people change their automobile motor oil, antifreeze, transmission oil, and other automobile engine or mechanical equipment fluids by themselves. Storing, transporting, collecting and disposing of such multipurpose fluids in a proper manner has been a problem. Two prior typical attempts to solve these problems are disclosed in U.S. Pat. No. 1,554,584 issued to L. D. Long on Sept. 22, 1925 and U.S. Pat. No. Re. 27,449 originally issued to R. O. Bartz as U.S. Pat. NO. 3,410,438 on Nov. 12, 1968. However, these devices have a number of drawbacks. Neither disclosed container is designed to initially store and transport the oil, requiring the use of an additional container for new motor oil which must be disposed of. Furthermore, no means are provided for venting the container to avoid splattering as spent fluid enters the container and the funnel inlet surface for the spent motor oil was limited to a portion of the upper surface. In addition, the manipulation of the container is made awkward by either lack of a suitable handle or a poorly designed handle.

Special purpose fluid collecting containers, such as bedpans, are disclosed in U.S. Pat. Nos. 380,478; 1,346,388; and 1,396,382. In general, these special purpose containers are not suitable for storage of fluids and care is required during transport to avoid spillage due to inadequate sealing.

SUMMARY OF THE INVENTION

This invention provides a new and improved container for new and spent fluids such as motor oil.

This invention comprises a container of four generally rectangular shaped sides with a top and bottom. One of the sides has a funnel shaped cross-section tapering to a closable inlet to collect spent fluids such as motor oil. Also, formed in a side of the container is a handle for either transporting in a vertical or horizontal position or for desirable manipulation of the container. The top contains a sealable outlet for the fluid contents of the container. The top outlet is positioned closely adjacent the side acting as a funnel to serve as a vent but it is also located a sufficient distance from the funnel inlet to avoid splattering through the vent. The funnel inlet can originally be provided with a sealing membrane to prevent leakage of the fluid contents while used to store new fluids. After discharging the original fluid contents, the membrane may be perforated to allow flow on the funnel side wall into the container.

BRIEF DESCRIPTION OF THE DRAWINGS

FIG. 3 is a plan view of the first side wall showing the funnel surface, the cap of the outlet and the handle;

FIG. 4 is a cross-section view taken along line 4—4 of FIG. 3; and

FIG. 5 is an alternative embodiment of the view taken along line 5—5 of FIG. 3 showing a opening on the first side wall and the cap therefor.

DESCRIPTION OF THE PREFERRED EMBODIMENT

Figure 1:
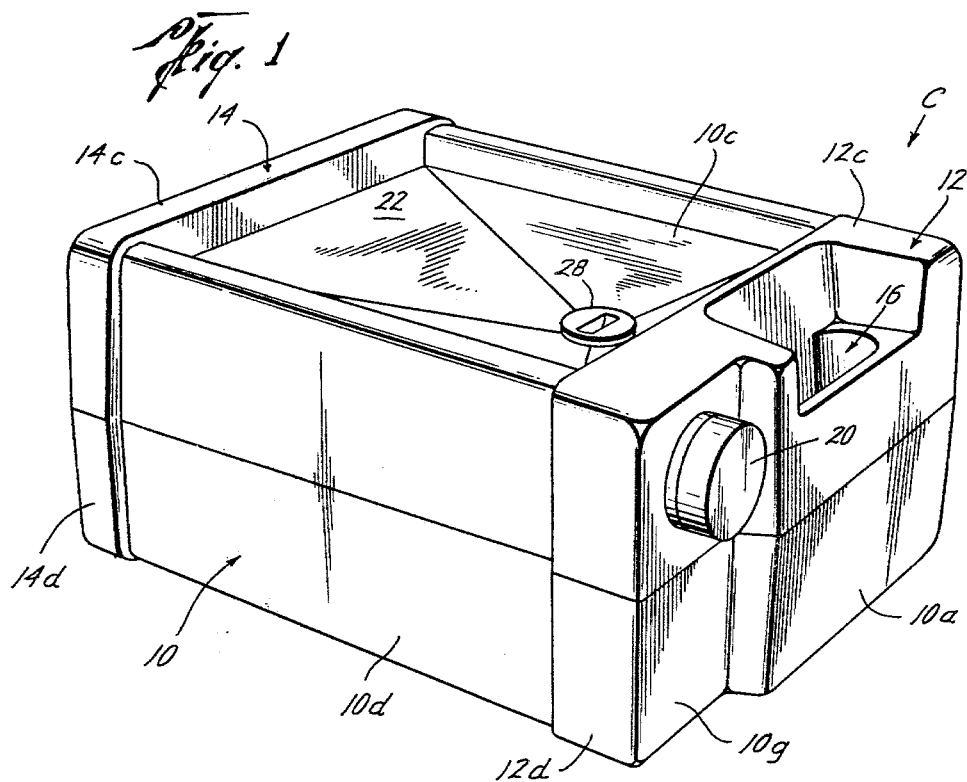
FIG. 1 is a perspective view of the container of the present invention illustrating the top wall and the first and second side walls.

Referring to the drawings, the letter C generally designates the multipurpose container of the preferred embodiment of this invention. The multipurpose container or receptacle C of this invention includes a container body 10 formed by a top wall 10a, a bottom wall 10b, and a first, second, third, and fourth, connected substantially rectangular side walls designated 10c through f, respectively, which join the top 10a and bottom 10b to enclose the internal cavity or interior 11 of the hollow container C. (FIG. 5). The first side wall 10c is oppositely disposed to third side wall 10e while the second side wall 10d is oppositely disposed to side wall 10f and substantially parallel thereto. Each side wall has an enlarged portion or area adjacent to the top wall 10a and the bottom wall 10b for forming a top shoulder 12 and a bottom shoulder 14. Each shoulder is composed of four segments 12c, 12d, 12e and 12f and 14c, 14d, 14e and 14f corresponding to their respective side walls. These shoulder areas 12 and 14 strengthen the container C by providing greater rigidity. The shoulder 12 and 14 also provide spaced securing shoulders or retainers between which removable wrap-around printed material of instructional, promotional or other nature may be secured to the container C.

Formed in the top shoulder segment 12c of side wall 10c, adjacent the top wall 10a, is a carrying or manipulating handle 16 as illustrated in FIGS. 3 and 4. The handle generally is comprised of four wall portions or connected surfaces 16a, 16b, 16c and 16d and a bottom wall portion 16e. The wall portion 16a is located adjacent the top 10a to enable easier vertical carrying of the container C. By gripping both the handle 16 and the top wall 10a, the container C may also be carried horizontally or manipulated for filling with spent oil or pouring new oil. Locating the handle 16 in top shoulder segment 12c also increases the usable volume of the interior 11 for collecting spent fluid in relation to the outer dimensions of the container C.

As illustrated in FIG. 5, an outlet 18 includes a cylindrical extension 18a projecting outwardly from a recessed portion 10g of the top wall 10a of the body 10 and in open communication through an aperture or opening 18b formed in top wall 10a, with the interior 11 of the container 10c. External helical threads 18c formed on extension 18a serve to releasably secure a first conventional sealing cap 20 to the outlet 18. Preferably, the portion 10g is recessed sufficiently, as best illustrated in FIG. 3, to allow easy and compact stacking of the container C.

The second, third and fourth sides 10d, 10e and 10f, respectively, and the shoulder areas 12 and 14 are of substantially rectangular construction. The first side 10c has a generally tapered concave fluid collecting outer surface 22 of funnel shaped cross-section as illustrated in FIGS. 1 and 4. Preferably, this fluid collecting outer surface includes substantially all of the first side wall 10c to provide as large a collecting surface 22 as possible. The surface 22 is made up of four downwardly sloping, generally triangular portions 22a, 22b, 22c and 22d. The base of triangular portion 22a being approximately contiguous with the bottom shoulder area 14c and the base of triangular portion 22c being approximately contiguous with the top shoulder 12c. The triangular portions 22b and 22d have bases substantially contiguous with sides 10d and 10f, respectively. The apexes of the sloping triangular surface portions 22a, 22b, 22c and 22d join at the lowermost point to form an opening 24 serving as a fluid inlet communicating with the interior 11. The inlet opening 24 includes a second internally threaded cylindrical portion or connection 24a which projects inwardly into the interior 11 from said first side 10c to terminate at a bottom edge 24b. The second threaded cylindrical portion 24a receives a second threaded sealing plug or cap 28 having external threads 28a for releasably engaging and sealing with the threaded cylindrical portion 24a of the opening 24. The plug 28 forms a flat top 28b having a slot 28c formed therein to enable convenient screwing and unscrewing of the second cap 28. In the initial use of the present invention, which is with fresh fluid or motor oil filling the interior 11 of the container body 10, the bottom edge 24b of the cylindrical portion 14a is sealed by a membrane 26 (FIG. 4). The membrane 26 is preferably formed of the same material as the container body 10 and is designed to initially seal the inlet opening 24 and after perforation, to allow fluid to flow into the receptacle 11 through opening 24.

In an alternative embodiment, as shown in FIG. 5, the opening 24 will include a flat walled downwardly tapering cylindrical portion 25 in place of the threaded portion 24a. A plug 29 will be used to seal the opening 24 in cooperation with portion 25. The plug 29 will be formed by a flat walled downwardly tapered cylinder 29a with a bottom wall 29b. A panel 29c will be attached to the bottom wall 29b and across the cylinder 29a to provide a means to manipulate the plug 29 in sealing and unsealing of the opening 24. The bottom edge 25a of portion 25 will be sealed by membrane 27 similar to membrane 26.

Figure 2:
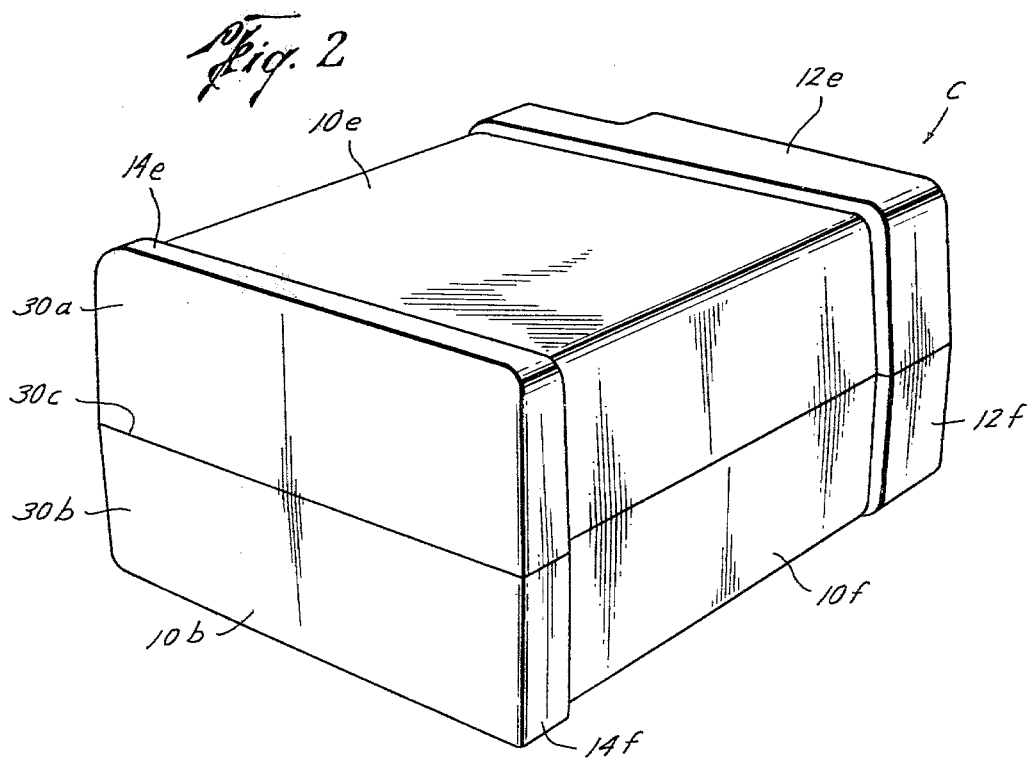
FIG. 2 is another perspective view of the container illustrating the bottom wall and the third and fourth side walls.

In the preferred embodiment, the container will be preferably made from high density polyethylene material by forming processes well known. A number of different mechanisms may be used to form the material, but it is believed preferable to blow mold the container shown in FIG. 5. It is also possible to form the container by molding two halves designated as 30a and 30b in FIG. 2 which may then be sealed to be formed into the container along the seam line 30c by means well known in the art.

OPERATION OF THE PRESENT INVENTION

In the use and operation of the present invention, the container C is initially in the condition illustrated in FIG. 4 with the membrane 26 in place and the interior 11 filled with fresh fluid (not shown). When it is desirable to use the fresh fluid, the cap 20 is removed and the fresh fluid is discharged through opening outlet 18 such as by pouring fresh oil into an automobile engine crankcase in the usual manner.

Once the automobile engine crankcase has been filled and the container C is empty, the container C is readied for a later use as a container for spent motor oil. The wrap-around printed material is removed and membrane 26 perforated for enabling use as a collecting device.

When it is desirable to use the container C as a collecting device for spent fluid, the empty container body 10 of the invention is located under the drainhole of the device to be drained with the first side wall 10c facing the drainhole. The plug 28 is removed and the first cap 20 is loosened sufficiently to provide an air passage or may be removed completely. Because the funnel shaped outer surface 22 encompasses substantially all of the first side 10c, there is no need to locate the container below the drainhole with a high degree of accuracy and any movement or manipulation of the container 10 for positioning is easily accomplished through the use of handle 16. The drainhole is then unsealed and as the spent fluid flows onto the surface 22, it is directed by the funnel shaped surface 22 through the inlet opening 24 for filling the interior 11 of the container C. As the inlet opening 24 may be completely filled with spent fluid, air trapped in the interior 11 will vent through the opening outlet 18 and which will enable faster flow into the interior 11. The lowermost portion of the vent outlet 18 is preferably located higher than the bottom edge 24b of the inlet 24 to cause effective venting and minimize possible overflow. If the volume of spent fluid is sufficiently small, the container could be constructed with the bottom edge 24b above the lowermost portion of outlet 18.

The inlet opening 24 is also arranged substantially away from the outlet 18 so that any splattering from the spent fluid flowing into the interior 11 will not pass out the vent outlet 18. Once all the fluid has drained into the interior 11, the container 10 is removed from under the car by the use of handle 16 and if desired, may be transported horizontally by the use of handle 16 to a convenient location. The cap 28 may be screwed in through the use of slot 28d to seal the inlet opening 24 and the cap 20 is tightened onto the outlet 18 to seal that opening. The handle 16 may then be used to carry the container vertically to a storage or disposal site.

The operation of the alternative embodiment shown in FIG. 5 is similar except that the opening 24 is sealed by pressing plug 29 into sealng contact with cylindrical portion 25 and panel 29c is used to manipulate plug 29.

The drainhole may be resealed and a new container C having fresh motor oil in it may be used to refill the automobile crankcase to commence repeating the process enabled by the present invention.

The foregoing disclosure and description of the invention are illustrative and explanatory thereof, and various changes in the size, shape and materials as well as in the details of the illustrated construction may be made without departing from the spirit of the invention as defined by the scope of the claims.

I claim:
1. A unitary multipurpose container for storing, transporting, collecting and disposing of fluids such as motor oil and the like, including:
   a container body having a top wall, a bottom wall and connected side walls joining said top wall and bottom wall for forming an interior cavity;
   said top wall having an aperture formed through said top wall for communication with said interior cavity;
   means for releasably sealing said aperture formed through said top wall;
   one of said side walls formed with a substantially concave outer surface for collecting fluids;
   an opening formed in said side wall constituting said substantially concave surface for communication with said interior cavity, said concave outer surface formed for flowing the collected fluids through said opening;

means for releasably sealing said opening formed on said side wall with the substantially concave surface;

said container body being formed to define a handle for carrying said container body;

a perforable membrane sealing said opening formed in said side wall having the substantialy concave surface; and said aperture in said top wall disposed adjacent said side wall having the substantially concave surface to serve as a container body vent while said opening formed in said substantially concave surface wall is located a sufficient distance from said aperture in said top wall to prevent splattering of fluid from the interior of the cavity through said aperture in said top wall.

2. The container as set forth in claim 1, wherein:
said handle is formed by a recess in said side wall having a substantially concave surface to increase usable volume of said interior in relation to the outer dimensions of the container.

3. A unitary multipurpose container for storing, transporting, collecting and disposing of fluids such as motor oil and the like comprising, in combination:
an enclosed rectangular shaped container body having an oppositely disposed top wall and bottom wall, and generally rectangular shaped first, second, third and fourth side walls joining said top wall and bottom wall and each other for forming an interior cavity, said first side wall oppositely disposed to said third side wall and said second side wall oppositely disposed to said fourth side wall;

said first side wall formed with a substantially concave surface for collecting fluids and directing their flow interior of said cavity;

said container body designed to rest on said bottom wall to maintain said container body in an upright position when fluids such as motor oil and the like are stored in said container and to rest on said third side wall when fluids such as spent motor oil and the like are to be collected in said container;

a first threaded cylinder projecting outwardly from the top wall of said container body and in communication with said interior cavity of said container body to act as an outlet when fluids such as motor oil and the like are stored in said container;

a first cap adapted to cooperate with said first threaded cylinder for releasably sealing said container body when transporting or storing fluids such as motor oil or the like;

a second cylinder projecting inwardly from said first side wall to provide communication with said interior cavity of said container body for fluids such as spent motor oil and the like directed by the substantially concave surface when said container is used to collect fluids;

a membrane at the lower end of said second cylinder to seal said second cylinder when said container is initially used to store and transport fluids such as motor oil and the like, operable to be perforated when said container body is placed on its third side wall to collect fluids such as spent motor oil and the like;

a second cap operable for releasably sealing said second cylinder after fluids such as motor oil and the like have been collected in said container for disposal; and a handle formed in a side wall of said container body to provide means for transporting the container and to facilitate placement of the container when fluids such as spent motor oil and the like are to be collected.

4. A unitary multipurpose container for storing, transporting, collecting and disposing of fluids such as motor oil and the like, in accordance with claim 3, wherein:
the lower end of said second cylinder lies in a plane below the lowermost edge of said first threaded cylinder when said container body is placed on said third side wall to collect fluids such as spent motor oil and the like.

5. A unitary multipurpose container for storing, transporting, collecting and disposing of motor oil or the like in accordance with claim 4, wherein:
said second cylinder is located at the lowermost point of said substantially concave surface of said first side wall; and said lowermost point is located substantially away from said first threaded cylinder.

6. A unitary multipurpose container for storing, transporting, collecting and disposing of motor oil or the like, in accordance with claim 4, further comprising:
shoulder areas with said first, second, third and fourth side walls adjacent said top wall and said bottom wall to give increased rigidity to said container and to hold wraparound printed material.

7. A unitary multipurpose container for storing, transporting, collecting and disposing of motor oil or the like, as in claim 3, wherein:
said handle is formed in said first side wall adjacent said top wall in one of said shoulder areas to allow carrying of the container in horizontal or vertical positions.

8. A unitary multipurpose container for storing, transporting, collecting and disposing of motor oil or the like, as in claim 6, wherein:
said substantially concave surface comprises substantially all of said first side wall except said shoulder areas so as to maximize drainage area.

* * * * *